United States Patent [19]

Amaki et al.

[11] Patent Number: 5,142,740
[45] Date of Patent: Sep. 1, 1992

[54] TOILET COVERING HINGE ASSEMBLY

[75] Inventors: Tsutomu Amaki, Toyonaka; Tsutomu Okumoto, Osaka, both of Japan

[73] Assignee: Matsushita Electric Works, Ltd., Osaka, Japan

[21] Appl. No.: 711,777

[22] Filed: Jun. 7, 1991

[30] Foreign Application Priority Data

Jun. 9, 1990 [JP] Japan ................ 2-60878[U]
Jun. 9, 1990 [JP] Japan ................ 2-60879[U]
Jun. 9, 1990 [JP] Japan ................ 2-60880[U]

[51] Int. Cl.⁵ ........................ E05D 5/12; A47K 13/12
[52] U.S. Cl. ........................................ 16/381; 4/236
[58] Field of Search ............. 16/381, DIG. 9; 4/236, 4/240

[56] References Cited

U.S. PATENT DOCUMENTS

636,332  11/1899  Glover .................... 16/381
5,010,601  4/1991  Kobayashi et al. ............ 4/236

Primary Examiner—Robert L. Spruill
Assistant Examiner—Carmine Cuda
Attorney, Agent, or Firm—Armstrong, Nikaido, Marmelstein, Kubovcik & Murray

[57] ABSTRACT

A toilet covering hinge assembly for mounting a toilet covering to the rear of a toilet for rotation of the toilet covering about a hinge axis between a lowered and a raised position. The hinge assembly includes a hinge element which is provided at the rear end of the toilet covering and is formed with a bore extending along the hinge axis. A hinge shaft extends through the bore in a rotatively fixed relation thereto so as to be rotatable together with the toilet covering about the hinge axis. One end of the hinge shaft is received by a support member provided on the side of the toilet for allowing the hinge shaft to rotate together with the toilet covering relative to the toilet. A retainer spring is secured to the hinge element adjacent to the bore for latching the hinge shaft against an axial movement thereof. The retainer spring comprises an outer section and an inner section having an inner edge projecting radially inwardly into the bore and capable of being resiliently deformed into and out of locking engagement with a stepped shoulder in the outer surface of the hinge shaft.

10 Claims, 6 Drawing Sheets

TOILET COVERING HINGE ASSEMBLY

BACKGROUND OF THE INVENTION

1. Field of the Invention

The present invention is directed to a toilet covering hinge assembly, and more particularly to a hinge assembly for mounting the toilet covering such as a toilet seat and lid for movement from its raised position to a lowered position upon a toilet with a simplified hinge shaft supporting structure.

2. Description of the Prior Art

It has been a general practice to mount a toilet covering such as a toilet seat and lid to a toilet by means of a hinge shaft with an associated nut for securing the hinge shaft on the toilet covering or on the side of the toilet. Mounting the toilet covering, therefore, requires a rather cumbersome operation of rotating the nut in a limited space at the rear end of the toilet for fastening it on the hinge shaft extending through a bore in the toilet covering. In addition, the nut may sometime cling or be glued at its meshing engagement with the hinge shaft by being rusted or corroded due to constant exposure to a moisture environment. As a result of this, it is difficult to detach the toilet covering from the toilet and therefore an inconvenient and time-consuming effort should be made in order to clean or replace the toilet covering.

SUMMARY OF THE INVENTION

The above problem has been eliminated in the present invention which provides an improved toilet covering hinge assembly which is capable of easily mounting and demounting a toilet covering for cleaning and replacement purposes. The toilet covering hinge assembly in accordance with the present invention comprises a hinge element with a bore provided at the rear end of the toilet covering. A hinge shaft extends through the bore in a rotatively fixed relation thereto for rotation of the toilet covering about a hinge axis between a lowered position on the toilet and a raised position. A support means is provided on the side of the toilet for receiving one end of the hinge shaft to allow the hinge shaft to rotate together with the toilet covering relative to the toilet. A retainer spring is secured to the hinge element adjacent to the bore for latching the hinge shaft against an axial movement thereof. The retainer spring comprises an outer section and an inner section having an inner edge projecting radially inwardly of the bore and capable of being resiliently deformed into and out of latching engagement with a stepped shoulder in the outer surface of the hinge shaft. With the use of the retainer spring, it is readily possible to attach the hinge shaft to the toilet covering simply by forcibly inserting it into the bore while deforming the inner section of the retainer spring outwardly, after which the inner section of the retainer spring is resiliently urged inwardly into latching engagement with the stepped shoulder. Detachment of the hinge shaft is also effected simply by pulling the hinge shaft out of the bore during which the inner section of the retainer spring can be resiliently deformed to be disengaged from the stepped shoulder of the hinge shaft.

Accordingly, it is a primary object of the present invention to provide a toilet covering hinge assembly which is capable of attaching and detaching the hinge shaft simply by inserting or pulling it into and from the bore for easy mounting and demounting of the toilet covering to and from the toilet.

The bore is formed at its one end with a countersink in which the outer section of the hinge spring is seated with its one end face adhered to a bottom of the countersink so as to provide a clearance between the bottom of the countersink and the corresponding end face of the inner section of the retainer spring. With the provision of the clearance, the inner section of the retainer spring, which is responsible for latching engagement with the hinge shaft, can be well protected from contacting with an adhesive utilized to adhere the outer section to the countersink. The inner section of the retainer spring can be kept intact free from the adhesive to thereby assure reliable latching engagement with the hinge shaft, which is therefore another object of the present invention.

Preferably, the outer section is formed with a rib which blocks the adhesive from entering the inner section for further assuring reliable latching engagement of the hinge shaft to the retainer spring.

In a preferred embodiment, a concentric pair of seat and lid hinge shafts are utilized to mount a toilet seat and a toilet lid, respectively for rotation thereof about a common hinge axis between a lowered position and a raised position. To this end, the toilet seat is provided at its rear end with an axially spaced pair of seat hinge elements having first and second seat bores extending in alignment with the hinge axis, while the toilet lid is likewise provided at its rear end with an axially spaced pair of lid hinge elements having first and second lid bores extending in alignment with the hinge axis. The seat hinge shaft extends through a set of the first seat bore and the adjacent second lid bore in a rotatively fixed relation to the first seat bore but in a freely rotatable relation to the second lid bore so that the seat hinge shaft is pivotable together with the toilet seat but freely rotatable relative to the toilet lid. The lid hinge shaft extends through another set of the second seat bore and the adjacent first lid bore in a rotatively fixed relation to the first lid bore but in a freely rotatable relation to the second seat bore so that the lid hinge shaft is pivotable together with the toilet lid but freely rotatable relative to the toilet seat. The one ends of the seat and lid hinge shafts are respectively received in first and second support means provided on the sides of the toilet in order to allow the seat and lid hinge shafts to rotate together with the toilet covering and toilet lid respectively relative to the toilet about the hinge axis. Retainer springs are secured respectively to the seat hinge elements adjacent to the first and second seat bores, respectively for latching the seat and lid hinge shafts against the axial movements thereof. Each of the retainer spring comprises an outer section and an inner section having an inner edge projecting radially inwardly of the corresponding one of the first and second seat bores and capable of being resiliently deformed into and out of locking engagement with a stepped shoulder formed in the outer surface of each one of the seat and lid hinge shafts. Thus, the toilet seat and the toilet lid can be supported by the individual seat and lid hinge shaft to move from its raised position to the lowered position. The retainer springs are of the same configuration having the outer section in the form of an annulus and the inner section in the form of a C-shaped ring with a slit. The C-shaped ring is struck from the annulus to be integrally connected thereto at a portion diametrically opposite of the slit so as to define a pair of resilient arcuate legs extending oppositely from that portion to the slit for engagement with the stepped shoulder of the corresponding ones of the seat and lid hinge shaft at the inner edges thereof. Each of the seat and lid hinge shafts is configured to have a non-circular cross-section having a major axis and a minor axis. The first seat bores and the first lid bores are shaped to have the same cross-sectional shape in conformity with the cross-section of the seat and lid hinge shafts so that the toilet seat and lid are rotatable together with the seat and lid hinge shafts, respectively, with the seat hinge shaft rotatively fixed within the C-shaped ring of the retainer spring for the first seat bore with the major axis thereof displaced at substantially a right angle from the slit of the C-shaped ring. The second seat bore and the second lid bore are both shaped to be a circular cross-section to allow the corresponding seat and lid hinge shaft to freely rotatable therein and within the C-shaped ring of the retainer spring at the one end of the second seat bore. The retainer spring associated with the second seat bore is angularly displaced at substantially a right angle about the hinge axis from the retainer spring associated with the first seat bore such that, when the toilet seat is in the lowered position and the toilet lid is in the raised position to make the seat and lid hinge accessible, the lid hinge shaft is brought into an angular disposition within the retainer spring for the second seat bore where the major axis of the lid hinge shaft is displaced at substantially a right angle from the slit of the C-shaped ring in the same relationship between the seat hinge shaft to the retainer spring of the first seat bore. At this condition, both the seat and lid hinge shaft can be brought into the same orientation with respect to the C-shaped ring as being held between the opposed resilient legs of the C-shaped ring. With this result, the seat and lid hinge shaft can be detached from the associated retainer springs in the like manner and at substantially an equal pulling force as applied to resiliently urging the opposed legs of the C-shaped ring outwardly. This also means that the seat and lid hinge shafts can be attached in the like manner and at substantially an equal inserting force.

It is therefore a further object of the present invention to provide a toilet covering hinge assembly which is capable of mounting and demounting the toilet seat and lid easily and conveniently in the like fashion.

The support means is preferred to have a capability of damping the motion of the toilet seat and lid moving from the raised position to the lowered position in order to prevent accidental falling of the toilet seat and lid toilet attendant with an unpleasant loud impact noise, which is therefore a still further object of the present invention.

These and still other objects and advantageous features of the present invention will become more apparent from the following description of the embodiment when taken in conjunction with the attached drawings.

DETAILED DESCRIPTION OF THE EMBODIMENT

Figure 1:
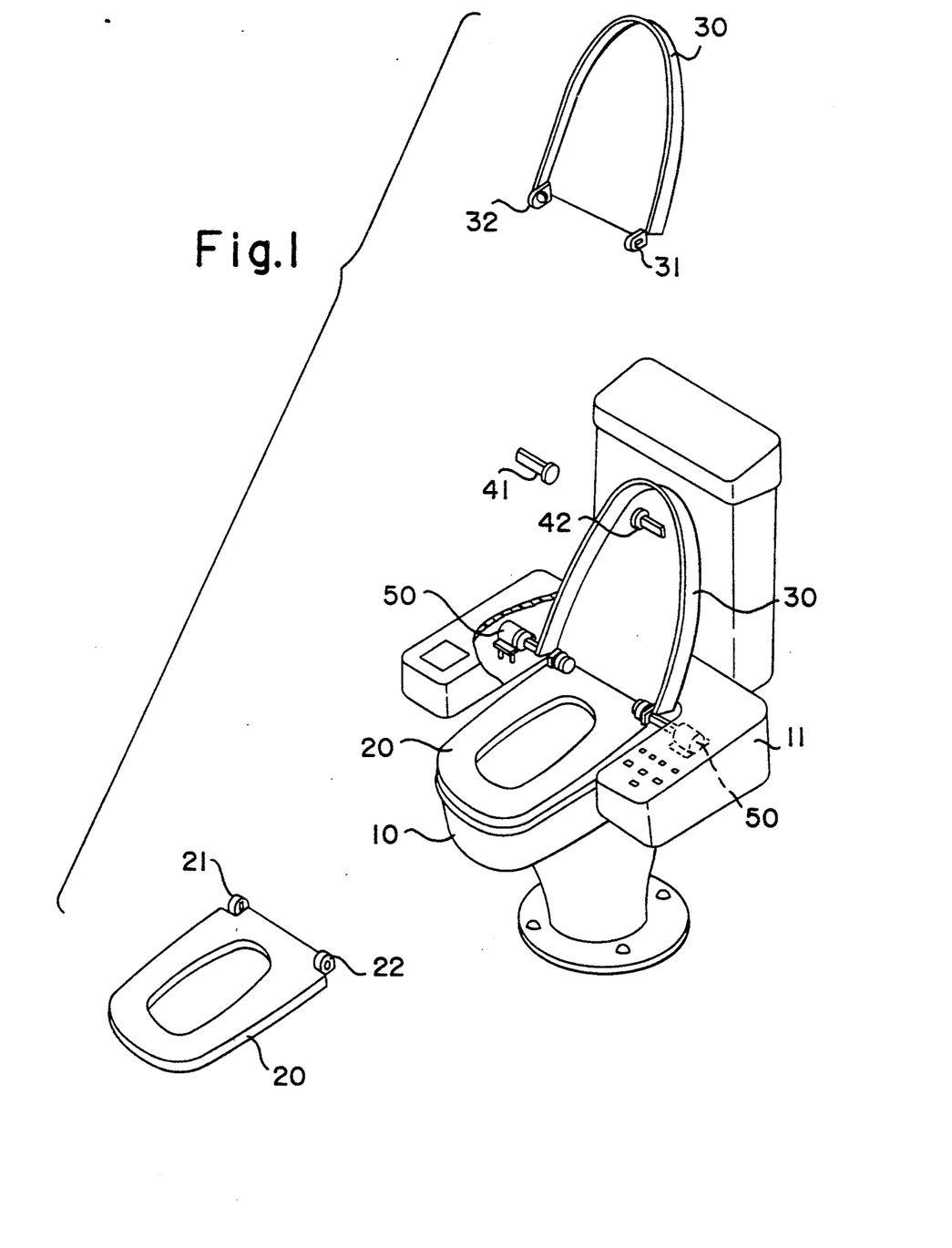
FIG. 1 is a perspective view of a toilet incorporating a toilet covering hinge assembly in accordance with a preferred embodiment of the present invention.
Figure 2:
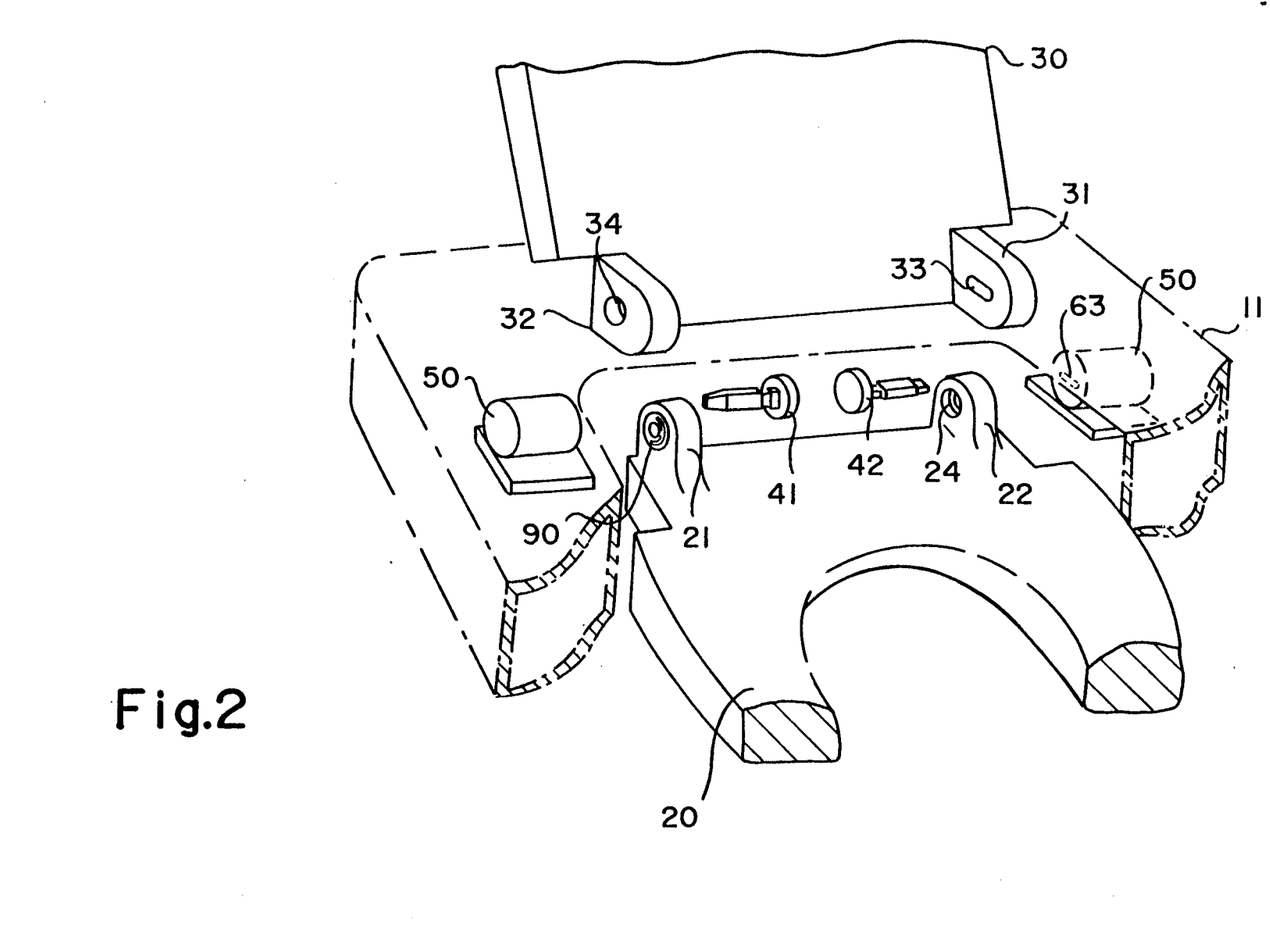
FIGS. 2 and 3 are exploded perspective views of a hinge connection of a toilet seat and a toilet lid, shown respectively in different directions.
Figures 3, 4:
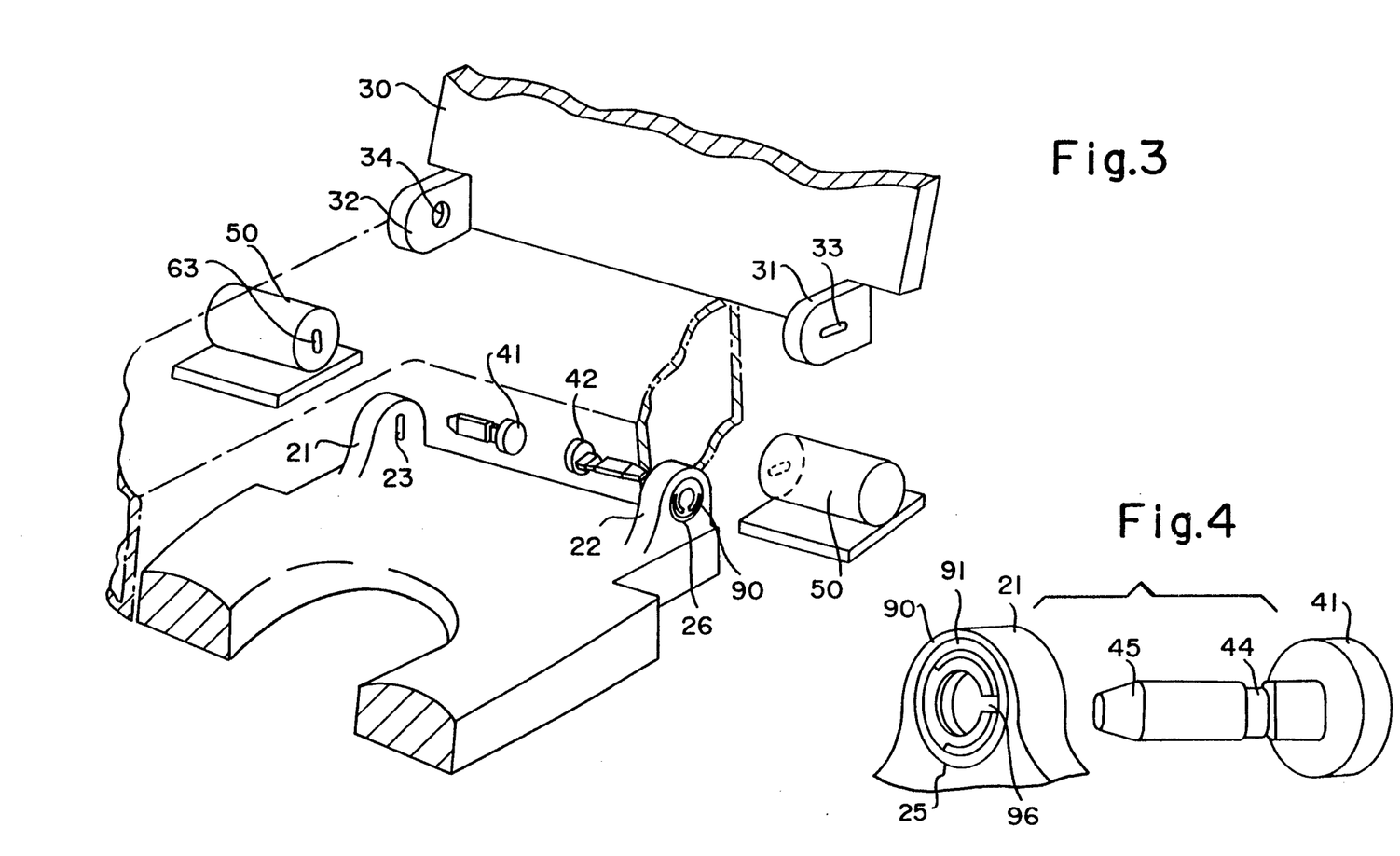
FIGS. 4 and 5 are exploded perspective and sectional views of a seat hinge shaft and its associated seat hinge tab on the toilet seat.
Figure 5:
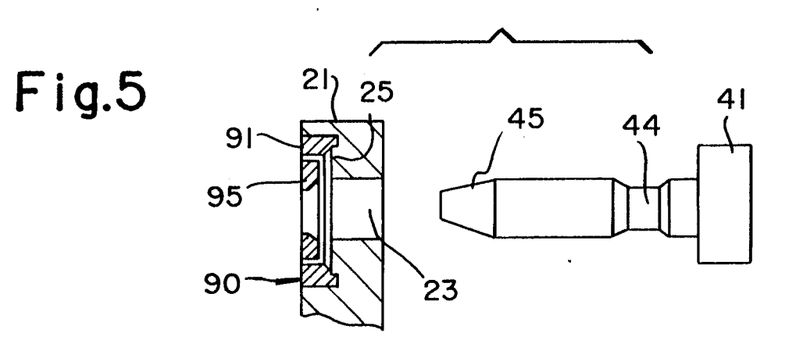

Referring now to FIG. 1, there is shown a toilet incorporating a toilet covering hinge assembly in accordance with the present invention. The assembly includes a toilet seat 20 and a toilet lid 30 which are mounted to the rear end of a toilet bowl 10 for rotation about a hinge axis between a lowered position on the toilet bowl 10 and a raised position. The toilet seat 20 and the toilet lid 30 can be collectively referred to as a toilet covering. As shown in FIGS. 2 and 3, a pair of seat hinge shafts 41 and lid hinge shaft 42 is provided in a horizontally spaced relation to connect the lateral sides of the toilet seat 20 and lid 30 to the toilet bowl 10 and define the hinge axis about which the seat 20 and lid 30 rotate. The seat 20 and the lid 30 are formed on the rear end respectively with a laterally spaced pair of seat brackets 21, 22 and with a laterally spaced lid brackets 31, 32 through which the hinge shafts 41 and 42 extend. Each of the brackets 21 and 31, which are formed on the seat 20 and the lid 30 in an opposite relation with respect to the lateral direction along the hinge axis, is formed to have an I-shaped bore 23, 33 with rounded ends, while each of the other brackets 22 and 32 is formed to have a round bore 24, 34. Each of the seat and lid hinge shafts 41 and 42 has its shank with an I-shaped cross-section in conformity with the bore 23, 33 so that it is tightly fitted the I-shaped bore 23, 33 but loosely fitted in the round bore 24, 34. Thus, the seat hinge shaft 41 is rotatable together with the toilet seat 20 but not with the lid 30, while the lid hinge shaft 42 is rotatable together with the lid 30 but not with the seat 20. Each of the seat and lid hinge shafts 41 and 42 has a reduced-in-diameter section 44 with stepped shoulders intermediate its ends and has a tapered end 45, as best shown in FIG. 4.

Figure 12:
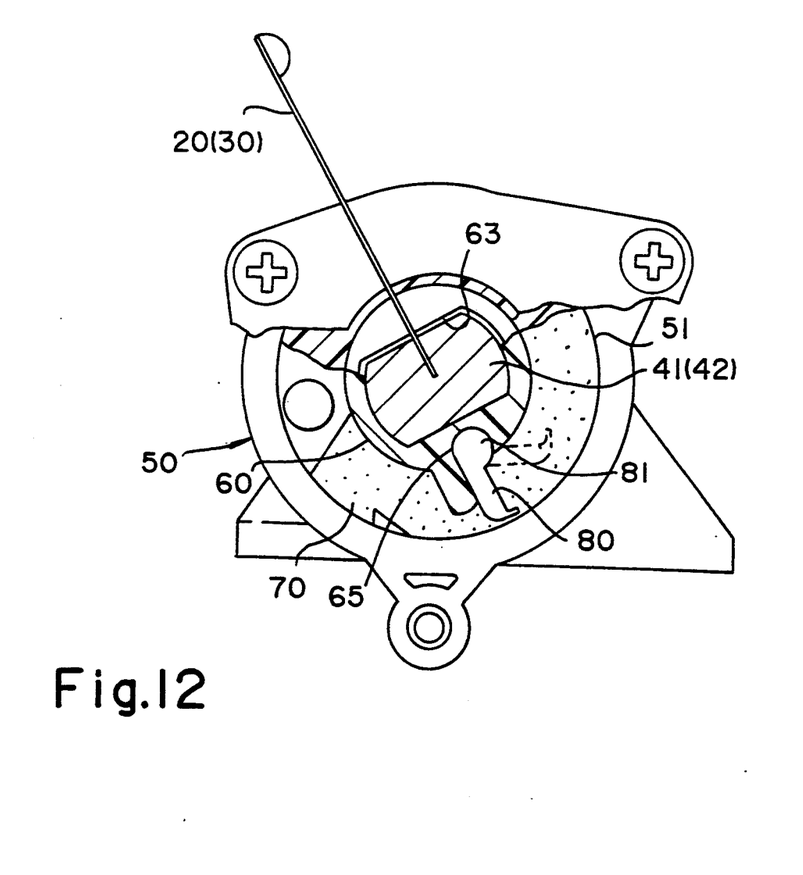
FIG. 12 is sectional view of a dashpot utilized to support the seat hinge shaft and the lid hinge shaft to dampen the movement of the toilet seat and lid moving from the raised position to the lowered position.

A pair of dashpots 50 is disposed within a casing 11 which surrounds the rear half of the bowl 11 to incorporate a device (not shown) capable of ejecting a hot water for washing posterior parts. The dashpots 50 are provided to receive one ends of the seat and lid hinge shafts 41 and 42, respectively in order to dampen the motion the toilet seat 20 and lid 30 moving from the raised position to the lowered position. As shown in FIG. 12, the dashpot 50 comprises a Cylinder housing 51 containing a damper fluid 70 such as a grease or the like and a rotor 60 rotatable within the cylinder 51. The rotor 60 is formed an I-shaped slot 63 extending axially and opened in the end face for receiving the corresponding end of the hinge shafts 41 and 42 so that the rotor 60 is rotatable together with the corresponding hinge shaft and therefore with the corresponding one of the toilet seat 20 and the toilet lid 30. A flap 80 projects on the rotor 60 to extend into the damper fluid 70 and is formed from a plastic material to have at its one end with an anchor bulb 81 which is received in a bearing cavity 65 formed in the outer surface of the rotor 60 so that the flap 80 is pivotally supported to pivot within a limited angular range between a folded condition where it lies down upon or is inclined with respect to the exterior of the rotor (as indicated by dotted lines in FIG. 12) and an unfolded condition where it projects radially (as indicated by solid lines in FIG. 12). The flap so is caused to pivot from the folded condition to the unfolded condition in response to the toilet seat 20 and the lid 30 moves down from the raised position to the lowered position, that is, the hinge shafts 41 and 42 rotate together therewith in the counterclockwise direction in FIG. 12, during which the flap 80 receives an increased resisting force from the damper fluid 70 so as to dampen or slow the lowering movement of the seat 20 and the lid 30. On the other hand, the flap 80 is caused to pivot from the unfolded condition to the folded position as the seat 20 and the lid 30 moves upward from the lowered position to the raised position, that is, the hinge shafts 41 and 42 rotate together therewith in the clockwise direction in FIG. 12, during which the flap 80 receives only a slight resisting force from the damper fluid 70 as the damper fluid 70 is allowed to freely flow through a gap formed between the interior surface of the cylinder 51 and end of the of the inclined flap 80. The two dashpots 50 are connected to the hinge shaft 41 and 42, respectively such that one dashpot is responsible for dampening the motion of the seat 20 while the other is for the lid 30. Since the seat 20 and the lid 30 rotate in the same manner, the two dashpots 50 are made into a symmetrical configuration. However, the details are illustrated only for one of the dashpots 50 for a simplicity purpose.

Figure 6:
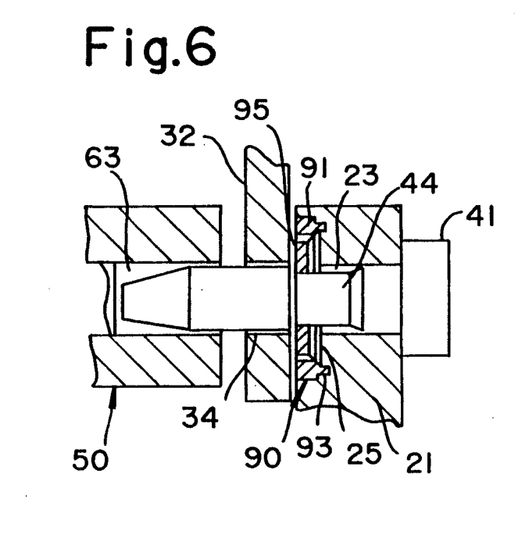
FIG. 6 is a sectional view of a hinge connection of the seat hinge shaft and its associated parts.
Figure 7:
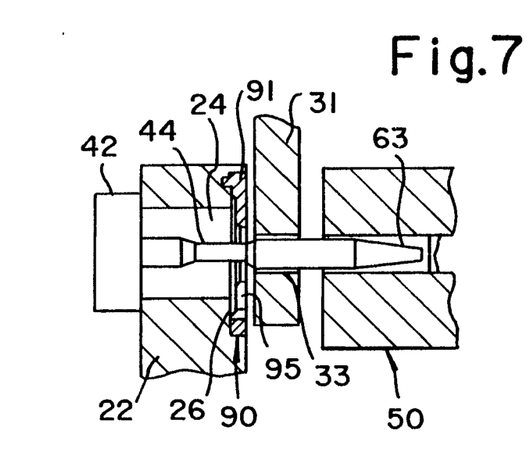
FIG. 7 is a sectional view of a hinge connection of a lid hinge shaft and its associated parts.
Figure 8:
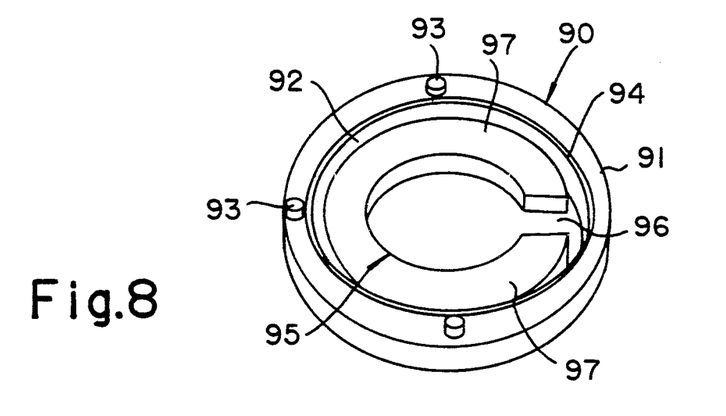
FIG. 8 is a perspective view of a retainer spring utilized for latching the seat and lid hinge shafts.
Figure 9:
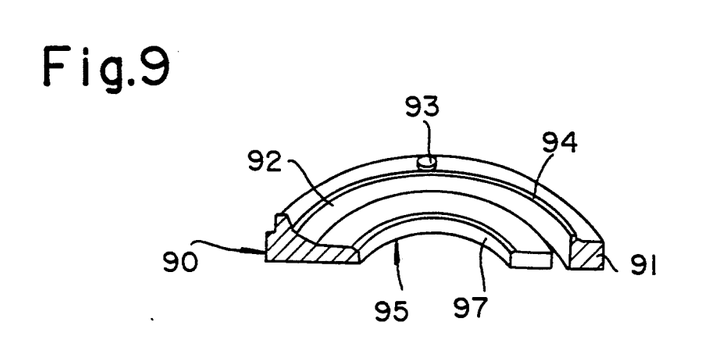
FIG. 9 is a perspective view of a portion of the retainer spring.
Figure 11:
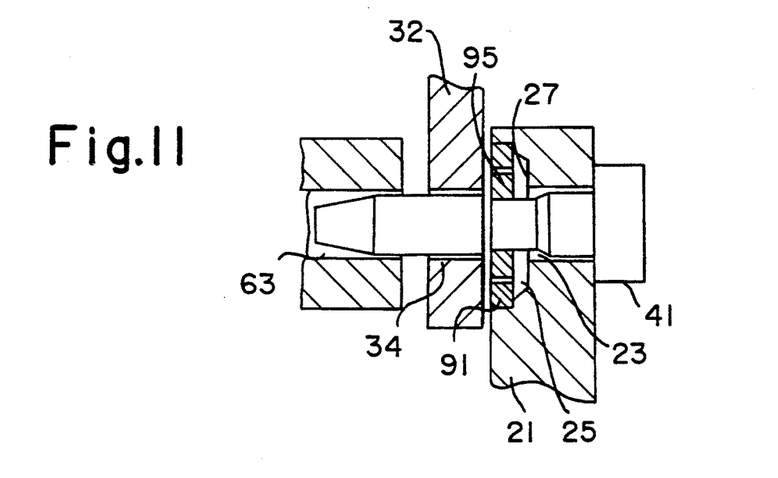
FIG. 11 is a sectional view of a modified structure of supporting the retainer spring to an associated hinge tab.

Now turning back to FIGS. 2 and 3, the seat bore 23 and 24 in the brackets 21 and 22 are each fitted with a retainer ring 90 which comes into latching engagement with the reduced-in-diameter section 44 of the corresponding one of the seat and lid hinge shafts 41 and 42 for retaining the shaft against the axial movement thereof. The retainer ring 90 is struck from a metal to have an outer annulus 91 and an inner C-shaped ring 95 with a slit 96, as shown in FIGS. 8 and 9. The C-shaped ring 95 is integrally connected to the annulus 91 at a portion 92 diametrically opposite of the slit 96 to form an opposed pair of resilient legs 97 capable of resiliently deforming for engagement at inner edges thereof with the stepped shoulder of the corresponding hinge shaft 41 and 42. The C-shaped ring 95 has a thickness less than that of the annulus 91 so as to have its one end face recessed from the corresponding end face the annulus 91 on which a set of circumferentially spaced studs 93 project. The annulus 91 is also formed with an integral rib 94 projecting on the end face and extending around the inner periphery of the annulus 91. The seat bores 23 and 24 are communicated at their axially outer ends respectively with countersinks 25 and 26 which are of the same rounded configuration for securing therein the retainer springs 90. As shown in FIGS. 6 and 7, the retainer springs 90 are fitted within the corresponding countersinks 25 and 26 with the annulus 91 seated against the bottom of the countersinks 25 and 26 and at the same time with the inner edge of the C-shaped ring 95 projecting radially inwardly of the associated seat bores 23 and 24 for engagement into the reduced-in-diameter section 44 of the corresponding one of the seat hinge shaft 41 and the lid hinge shaft 42. At this condition, the studs 93 are plugged into corresponding notches in the bottom of the countersinks 25 and 26 for positive engagement of the retainer rings 90 into the countersinks 25 and 26. In addition, to the annulus 91 is adhered to the bottom of the countersink 25, 26. Due to the presence of a clearance formed between the inner end face of the C-shaped ring 95 and the bottom of the countersink 25, 26, it is effected to prevent the adhesive from reaching the C-shaped ring 91 and therefore prevent the jamming of the resilient legs 97 by the adhesive. In this connection, the rib 94 is also effective to prevent the outflow of the adhesive toward the C-shaped ring 95. Alternately, as shown in FIG. 11, the countersink 25, 26 may be formed at its radially inner portion with a concavity 27 in order to give a like clearance between the C-shaped ring 95 and the adjacent bottom of the countersink 25 for preventing the jamming of the resilient legs 97 by the adhesive.

The assembly of the toilet seat 20 and the toilet lid 30 to the toilet can be easily performed simply by inserting the seat and lid hinge shafts 41 and 42 axially through the seat bores 23 and 24, lid bores 33 and 34, and into the slots 63 in the individual dashpots 50, during which the resilient legs 97 are resiliently deformed outwardly to allow the hinge shafts 41 and 42 to pass through the C-shaped rings 95. Thereafter, the legs 97 are urged inwardly into latching engagement into the reduced-in-diameter section 44, i.e., with the stepped shoulder at one end thereof, thereby retaining the hinge shafts 41 and 42 to the brackets 21 and 22 at the rear end of the toilet seat 20. The removal of the hinge shafts 41 and 42 can be also effected simply by forcibly pulling the shafts 41 and 42 axially inwardly. This causes the opposed resilient legs 97 to be deformed resiliently outwardly, allowing the slippage of the hinge shafts out through the C-shaped ring 95. Thus, the toilet seat 20 and the toilet lid 30 can be readily disassembled for facilitating cleaning and replacement.

Figure 10A:
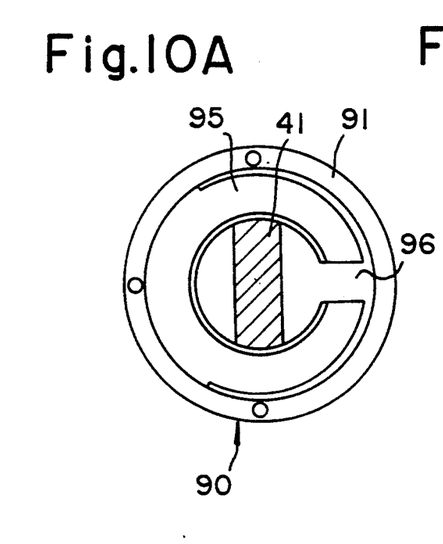
FIGS. 10A and 10B are explanatory views showing the angular disposition of the seat hinge shaft and the lid hinge shaft, respectively with respect to the associated retainer ring when the toilet seat is in a lowered position and at the same time the toilet lid is in a raised position of FIGS. 1 to 3.
Figure 10B:
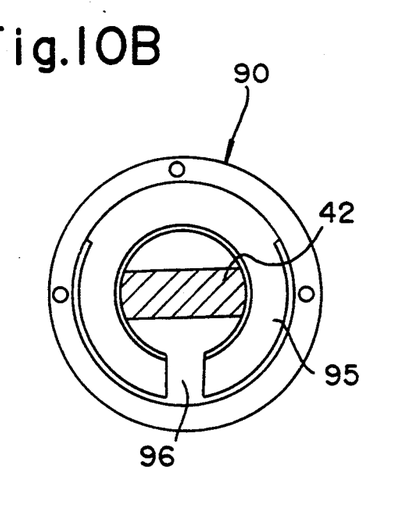

It is noted at this time that the seat hinge shaft 41 is rotatively fixed relative to the seat bore 23 and therefore to the C-shaped ring 95 so as to be rotatable together with the toilet seat 20 with the hinge shaft 41 kept constantly in the fixed relation to the C-shaped ring 95, as shown in FIG. 10A, in which the hinge shaft 41 is held between the resilient legs 97 with its major axis angularly displaced from the slit 96 by an angle of approximately 90°. While, on the other hand, the lid hinge shaft 42 is movable within the associated seat bore 24 and therefore within the C-shaped ring 95 as the toilet lid 30 moves between its raised position and lowered position. In order to effect assembling and disassembling both of the seat and lid hinge shafts 41 and 42 in the like manner at a condition where the toilet seat 20 is in the lowered position on the toilet bowl 10 and at the same time the toilet lid 30 is in the raised position for exposing the hinge shafts 41 and 42 to be readily accessible, the C-shaped ring 95 associated with the lid hinge shaft 42 is secured in the bracket 22 so as to orient the slit 96 of the C-shaped ring 95 at an angle of about 90° offset from that of the other C-shaped ring 90 for the seat hinge shaft 41, as shown in FIGS. 10A and 10B.

The lid hinge shaft 42 is held between the opposed legs 97 of the C-shaped ring 90 with its major axis angularly displaced at an angle of about 90° relative to the slit 96 in much the same relationship as the seat hinge shaft 41 to the associated C-shaped ring 90. Therefore, at the condition of FIG. 1 where the toilet seat 20 and the toilet lid 30 are respectively in the lowered and raised positions, the seat and lid hinge shafts 41 and 42 can be attached and detached in much the same way, thus facilitating to effect the assembly and disassembly easily without causing confusions. It is noted at this time that the retainer ring 90 may be secured to the brackets 21 and 22 adjacent to the respective bores 23 and 24 by any other suitable means than the adhesive.

What is claimed is:

1. A hinge assembly for mounting a toilet covering to the rear of a toilet for rotation of the toilet covering about a hinge axis between a lowered and a raised position, said hinge assembly comprising:
    a hinge element provided at the rear end of said toilet covering and having a bore extending along said hinge axis;
    a hinge shaft extending through said bore to rotatively support said toilet covering;
    support means provided on the side of said toilet for receiving one end of said hinge shaft to permit said toilet covering to pivot about said hinge axis relative to said toilet; and
    a retainer spring secured to said hinge element adjacent to said bore for latching said hinge shaft against an axial movement thereof, said retainer spring comprising an outer section and an inner section having an inner edge projecting radially inwardly of said bore and capable of being resiliently deformed into and out of latching engagement with a stepped shoulder in the outer surface of said hinge shaft, wherein said retainer spring comprises said outer section in a form of an annulus and said inner section in the form of a C-shaped ring with a slit, said C-shaped ring being struck from said annulus to be integrally connected thereto at a portion diametrically opposite of said slit so as to define a pair of resilient legs extending oppositely from that portion to said slit for engagement with said stepped shoulder of the said hinge shaft at the inner edges thereof, said C-shaped ring having a thickness less than said annulus to define said clearance between the corresponding faces of said annulus and said C-shaped ring when said annulus is adhered to said hinge element at one end of said bore.

2. A hinge assembly for mounting a toilet covering to the rear of a toilet for rotation of the toilet covering about a hinge axis between a lowered and a raised position, said hinge assembly comprising:
    a hinge element provided at the rear end of said toilet covering and having a bore extending along said hinge axis;
    a hinge shaft extending through said bore in a rotatively fixed relation thereto so as to be rotatable together with said toilet covering about said hinge axis;
    support means provided on the side of said toilet for receiving one end of said hinge shaft to allow said hinge shaft to rotate together with said toilet covering relative to said toilet; and
    a retainer spring secured to said hinge element adjacent to said bore for latching said hinge shaft against an axial movement thereof, said retainer spring comprising an outer section and an inner section having an inner edge projecting radially inwardly of said bore and capable of being resiliently deformed into and out of latching engagement with a stepped shoulder in the outer surface of said hinge shaft, wherein said retainer spring comprises said outer section in a form of an annulus and said inner section in the form of a C-shaped ring with a slit, said C-shaped ring being struck from said annulus to be integrally connected thereto at a portion diametrically opposite of said slit so as to define a pair of resilient legs extending oppositely from that portion to said slit for engagement with said stepped shoulder of the said hinge shaft at the inner edges thereof, said C-shaped ring having a thickness less than said annulus to define said clearance between the corresponding faces of said annulus and said C-shaped ring when said annulus is adhered to said hinge element at one end of said bore.

3. A hinge assembly as set forth in claim 1 or 2, wherein said support means having capability of damping the motion of said toilet covering moving from its raised position to a lowered position upon said toilet.

4. A toilet covering hinge assembly for mounting a toilet covering to the rear of a toilet for rotation of the toilet covering about a hinge axis between a lowered and a raised position, said hinge assembly comprising:
    a hinge element bore provided at the rear end of said toilet covering and having a bore extending along said hinge axis;
    a hinge shaft extending through said bore in a rotatively fixed relation thereto so as to be rotatably together with said toilet covering about said hinge axis;
    support means provided on the side of said toilet for receiving one end of said hinge shaft to allow said hinge shaft to rotate together with said toilet covering relative to said toilet; and
    a retainer spring secured to said hinge element at one end of said bore for latching said hinge shaft against an axial movement thereof, said retainer spring comprising an outer section to be adhered on a portion of said hinge element around the periphery of said bore and an inner section having an inner edge projecting radially inwardly of said bore and capable of being resilient deformed into and out of latching engagement with a stepped shoulder in the outer surface of said hinge shaft, said inner section being recessed from said outer section in the axial direction such that said inner section including said inner edge is axially spaced from the portion of said hinge element on which said outer section is adhered to have a clearance therebetween, wherein said retainer spring comprises said outer section in a form of an annulus and said inner section in the form of a C-shaped ring with a slit, said C-shaped ring being struck from said annulus to be integrally connected thereto at a portion diametrically opposite of said slit so as to define a pair of resilient legs extending oppositely from that portion of said slit for engagement with said stepped shoulder of the said hinge shaft at the inner edges thereof, said C-shaped ring having a thickness less than said annulus to define said clearance between the corresponding faces of said annulus and said C-shaped ring when said annulus is adhered to said hinge element at one end of said bore.

5. A hinge assembly as set forth in claim 4, wherein said bore is formed at its one end with a countersink in which said outer section of said hinge spring is seated with its one end face adhered to a bottom of said countersink so as to provide said clearance between the bottom of said countersink and the corresponding end face of said inner section of said retainer spring.

6. A hinge assembly as set forth in claim 4, wherein said outer section is formed with a rib projecting and extending along the periphery of said inner section for blocking an adhesive utilized to adhere said outer section to the bottom of said countersink from reaching said inner section.

7. A hinge assembly as set forth in claim 4, wherein said annulus is provided with posts for engagement into correspondingly formed dents in the surface of said hinge element around the periphery of said bore.

8. A hinge assembly for mounting a toilet seat and a toilet lid to the rear of a toilet for rotation of the toilet seat and lid about a hinge axis between a lowered and a raised position, said hinge assembly comprising:

a pair of seat hinge elements provided at the rear end of said toilet seat, said seat hinge elements having first and second seat bores respectively extending in alignment with said hinge axis;

a pair of lid hinge elements provided at the rear end of said toilet lid, said lid hinge elements having first and second lid bores respectively extending in alignment with said hinge axis;

a pair of seat and lid hinge shafts for pivotally supporting said seat and lid to said toilet, said seat hinge shaft extending through a set of said first seat bore and adjacent said second lid bore in a rotatively fixed relation to said first seat bore but in a freely rotatable relation to said second lid bore so that said seat hinge shaft is pivotable together with said toilet seat but freely rotatable relative to said toilet lid, said lid hinge shaft extending through another set of said second seat bore and adjacent said first lid bore in a rotatively fixed relation to said first lid bore but in a freely rotatable relation to said second seat bore so that said lid hinge shaft is pivotable together with said toilet lid but freely rotatable relative to said toilet seat;

a pair of first and second support means provided on the side of said toilet for supporting one ends of said seat and lid hinge shafts, respectively so as to allow said seat and lid hinge shaft to rotate together with said toilet covering and toilet lid respectively relative to said toilet about said hinge axis; and a pair of retainer springs secured respectively to said seat hinge elements adjacent to said first and second seat bores, respectively for latching said seat and lid hinge shafts against the axial movements thereof, each of said retainer spring comprising an outer section and an inner section having an inner edge projecting radially inwardly of the corresponding one of said first and second seat bores and capable of being resiliently deformed into and out of latching engagement with a stepped shoulder formed in the outer surface of each one of said seat and lid hinge shafts, said retainer springs are of the same configuration having the outer section in a form of an annulus and the inner section in the form of a C-shaped ring with a slit, said C-shaped ring being struck from said annulus to be integrally connected thereto at a portion diametrically opposite of said slit so as to define a pair of resilient legs extending oppositely from that portion to said slit for engagement with said stepped portion of the corresponding ones of said seat and lid hinge shaft at the inner edges thereof.

9. A hinge assembly as set forth in claim 9, wherein each of said seat and lid hinge shafts configured to have a non-circular cross-section having a major axis and a minor axis;

said first seat bores and said first lid bores shaped to have the same cross-section as said seat and lid hinge shafts so that said toilet seat and lid are rotatable together with said seat and lid hinge shafts, respectively, with said seat hinge shaft rotatively fixed within said C-shaped ring of said retainer spring at said one end of said first seat bore with said major axis thereof displaced at substantially a right angle from said slit of said C-shaped ring;

said second seat bore and said second lid bore shaped to be a circular cross-section to allow the corresponding seat and lid hinge shafts to freely rotatable therein and within said C-shaped ring of said retainer spring at said one end of said second seat bore;

said retainer spring at said one end of said second seat bore angularly displaced at substantially a right angle about said hinge axis from said retainer spring at said one end of said first seat bore such that, when the toilet seat is in the lowered position and the toilet lid is in the raised position, said lid hinge shaft is brought into an angular position within said retainer spring of said second seat bore where the major axis of said lid hinge shaft is displaced at substantially a right angle from said slit of said C-shaped ring in the same relationship between said seat hinge shaft to said retainer ring of said first seat bore.

10. A hinge assembly as set forth in claim 8, wherein said support means having capability of damping the motion of said toilet seat and lid moving from the raised position to the lowered position upon said toilet.

* * * * *